United States Patent
Mohr et al.

(10) Patent No.: US 10,131,182 B2
(45) Date of Patent: Nov. 20, 2018

(54) MOTORCYCLE WHEEL

(71) Applicant: Bayerische Motoren Werke Aktiengesellschaft, Munich (DE)

(72) Inventors: Matthias Mohr, Aschheim (DE); Andreas Adam, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/612,315

(22) Filed: Jun. 2, 2017

(65) Prior Publication Data
US 2017/0267020 A1 Sep. 21, 2017

Related U.S. Application Data

(63) Continuation of application No. PCT/EP2016/050756, filed on Jan. 15, 2016.

(30) Foreign Application Priority Data

Feb. 4, 2015 (DE) ........................ 10 2015 201 950

(51) Int. Cl.
| | |
|---|---|
| *B60B 1/14* | (2006.01) |
| *B60B 27/02* | (2006.01) |
| *B60B 27/00* | (2006.01) |
| *B60B 1/08* | (2006.01) |

(52) U.S. Cl.
CPC ............ *B60B 1/14* (2013.01); *B60B 27/0047* (2013.01); *B60B 27/02* (2013.01); *B60B 1/08* (2013.01); *B60B 2900/111* (2013.01); *B60B 2900/112* (2013.01); *B60B 2900/351* (2013.01); *B60Y 2200/12* (2013.01); *Y02T 10/86* (2013.01)

(58) Field of Classification Search
CPC ............................. B60B 1/14; B60B 27/0047
USPC .................................... 301/6.1, 6.7, 6.8, 6.9
See application file for complete search history.

(56) References Cited

U.S. PATENT DOCUMENTS

| | | | |
|---|---|---|---|
| 2,016,436 A | * | 10/1935 | Jahnke .................... G05G 5/18 74/535 |
| 4,035,895 A | | 7/1977 | Lester |

(Continued)

FOREIGN PATENT DOCUMENTS

| | | |
|---|---|---|
| AT | 349 336 B | 3/1979 |
| DE | 29 47 120 A1 | 6/1980 |

(Continued)

OTHER PUBLICATIONS

German Search Report issued in counterpart German Application DE 10 2015 201 950.0 dated Jul. 16, 2015, with partial English translation (eleven (11) pages).

(Continued)

*Primary Examiner* — S. Joseph Morano
*Assistant Examiner* — Jean W Charleston
(74) *Attorney, Agent, or Firm* — Crowell & Moring LLP

(57) ABSTRACT

A motorcycle wheel is provided, in particular a motorcycle wheel suitable for use on an enduro motorcycle. The wheel includes a cast or forged rim having integrally spokes which extend toward a central hub connection region. The central hub connection region is configured to receive a hub element in a detachably fastened manner. The hub element forms a hub of the motorcycle wheel which is connectable to a motorcycle.

9 Claims, 1 Drawing Sheet

(56) References Cited

U.S. PATENT DOCUMENTS

| | | | | |
|---|---|---|---|---|
| 4,118,073 | A | * | 10/1978 | Marwitz .................. B60B 1/08 |
| | | | | 301/6.3 |
| 4,173,374 | A | * | 11/1979 | Resele .................... B60B 21/06 |
| | | | | 301/35.59 |
| 4,319,785 | A | | 3/1982 | Sato et al. |
| 4,809,802 | A | | 3/1989 | Seino et al. |
| 2008/0272644 | A1 | * | 11/2008 | Durrani ................ B22D 15/005 |
| | | | | 301/55 |

FOREIGN PATENT DOCUMENTS

| | | | |
|---|---|---|---|
| DE | 299 04 723 U1 | 8/1999 | |
| FR | 2 278 504 | 2/1976 | |
| FR | 2278504 A1 * | 2/1976 | ............... B60B 1/08 |
| JP | 2008-296737 A | 12/2008 | |
| TW | 201141720 A1 | 12/2011 | |

OTHER PUBLICATIONS

International Search Report (PCT/ISA/210) issued in PCT Application No. PCT/EP2016/050756 dated Mar. 16, 2016 with English translation (five (5) pages).

German-language Written Opinion (PCT/ISA/237) issued in PCT Application No. PCT/EP2016/050756 dated Mar. 16, 2016 (four (4) pages).

Ducati—The Redline Magazine Jan. 2014, S.11-17, URL: http://www.ducati.de/download.do?path=/cmsweb/upl/doc/Apparel/2014_PDF/Redline_Magazine_DE.pdf, [abgerufen am 15.07.2015] (eighty-three (83) pages).

* cited by examiner

MOTORCYCLE WHEEL

CROSS REFERENCE TO RELATED APPLICATIONS

This application is a continuation of PCT International Application No. PCT/EP2016/050756, filed Jan. 15, 2016, which claims priority under 35 U.S.C. § 119 from German Patent Application No. 10 2015 201 950.0, filed Feb. 4, 2015, the entire disclosures of which are herein expressly incorporated by reference.

BACKGROUND AND SUMMARY OF THE INVENTION

The invention relates to a multipart motorcycle wheel, particularly for enduro motorcycles.

Because of their high elasticity, spoke wheels are preferably used for enduro motorcycles. However, compared to cast wheels or forged wheels, spoke wheels are clearly heavier and more expensive with respect to their production and material. Cast wheels, in turn, are more likely to not be suitable for use in the enduro domain, because they are hardly suitable for rough terrain as a result of the lower ductility of the material.

It is therefore an object of the invention to provide a motorcycle wheel which combines rough-terrain suitability with lower weight and lower cost with respect to material and production.

According to the invention, a motorcycle wheel is suggested which has a forged rim and a central hub connection region, wherein spokes constructed in one piece at the rim extend from the rim to the central hub connection region, and a hub element, which can be fastened to a motorcycle and forms a hub of the motorcycle wheel, can be detachably fastened to the hub connection region. In this case, the hub element is preferably produced of pressure casting or gravity die-casting.

By the separation of the hub element to be fastened to the motorcycle from the rim with the spokes constructed thereon into different components, a modular system is ensured which makes it possible to mount different constructions on rims for different use purposes or on different models, without having to exchange the hub element. Also in the case of a damaged rim or in a repair case, a simple replacement of the rim can take place.

By the use of a forged wheel, the production costs and the weight of the motorcycle are clearly reduced compared to spoke wheels. In addition, the two-part solution is more cost-effective compared with completely forged wheels, as used, for example, in the case of super-sport motorcycles. Furthermore, the behavior of the wheel will improve with respect to radial run out and lateral run-out. Considerable design freedom is ensured by the one-piece construction of the rim and the spokes.

In an embodiment of the invention, it is provided that the hub connection region forms an axial opening, through which the hub element can be axially fitted and can be fastened to the hub connection region. The hub element can thereby extend through the axial width of the rim and provide a connection possibility to the motorcycle and to the hub connection region.

In a further advantageous embodiment, it is provided that the hub connection region and the hub element have a stellar shape in an axial top view. The stellar shape offers the possibility of providing, between stellar arms adjoining in the circumferential direction and extending radially outward, in each case, fastening positions between the hub part and the hub receiving device, to which the two components are screwed.

In an embodiment, it is further provided that the hub element has radially extending webs which, in the mounted condition, engage in recesses of the hub connection region. The webs provide a flat adjoining and enlarge the torque transmissibility between the hub part and the hub receiving device, i.e. indirectly by the rim and the tire.

In an alternative embodiment, the hub element has a flange, by way of which it is fastened to the hub connection area in a radially and axially adjoining manner. The radial adjoining is also made possible in a simple manner by the above-described fitting-through solution.

The multipart implementation of the motorcycle wheel with a separate hub element is further advantageous in that, for components or component assemblies provided in the wheel region, as for example, the braking system or the drive, receiving devices, formations or the like, can be arranged or integrally shaped on the hub element. In a variant, for example, brake domes are arranged on the hub element or integrated in the latter.

The hub connection region may be constructed as a circumferential ring part or collar part or in multiple parts on each of the spokes. In the latter case, a connection or linkage takes place between the hub part and an end section of the individual spokes, in which the hub connection region is provided. A circumferential single-piece connection of the individual hub connection regions is not necessary in the case of this variant.

It is further advantageous that the hub element is constructed as a hollow body. As a result, considerable weight is saved in the case of the casting.

In an embodiment, the axial dimension of the hub element is defined in such a manner that it corresponds essentially to an axial width of the rim.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
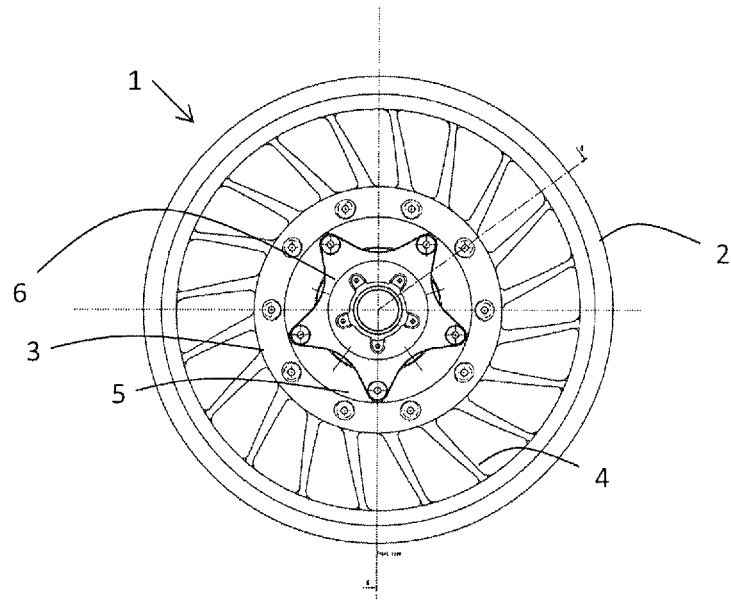
FIG. 1 is a lateral view of a motorcycle wheel in accordance with an embodiment of the present invention.
Figure 2:
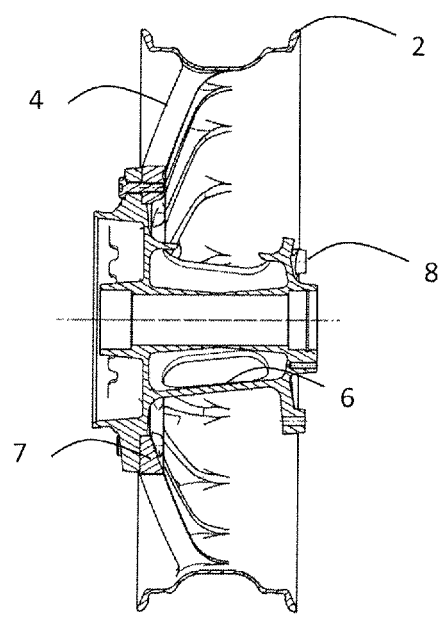
FIG. 2 is a sectional view of the wheel from FIG. 1.

FIG. 1 is a lateral view of a two-part motorcycle wheel 1. The motorcycle wheel 1 comprises a forged rim 2 and a central hub connection region 3. Spokes 4, which are constructed in one piece at the rim 2, extend between the rim 2 and the hub connection region 3. The shape and dimension of the spokes 4 can be defined in a variable manner. The hub connection region 3 forms an axial opening 5, through which a hub element 6 is fitted and is detachably fastened to the hub connection region 3 by a plurality of screws. The hub element 6 can, in turn, be fastened to a motorcycle that is not shown.

In the illustrated embodiment, the hub element 6, which is constructed in its axial dimension essentially as a hollow body, has a circumferential flange 7 in an axial end section. By way of this flange 7, the hub element 6 radially and axially adjoins the hub connection region 3, and therefore is indirectly fastened to the rim 2. The hub element 6 extends in its axial length essentially over the axial width of the rim 2 and provides receiving devices 8 for further assemblies on its lateral edge section.

In terms of its implementation, the invention is not limited to the above-indicated preferred embodiments. Instead, a number of variants is conceivable which utilize the illustrated solution also in the case of fundamentally different types of implementations. For example, the hub connection region may be a multipart design and be constructed at each radially interior end of the spokes, so that the hub element is fastened to each part of the hub connection region and the connection to the spokes or the rim is thereby ensured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle wheel, comprising:
   a rim;
   a plurality of spokes integrally formed with the rim; and
   a hub element,
   wherein
   the plurality of spokes extend from the rim to a central hub connection region which includes radially inner ends of the plurality of spokes,
   the hub element is configured to be detachably fastened to the plurality of spokes at the hub connection region at a plurality of spoke-fastening features of the hub element,
   the spoke fastening features of the hub element are located axially on an axis of rotation of the hub element away from a lateral center of the rim at least partially beyond an axially outward extent of the rim, and
   the radially inner ends of the plurality of spokes are displaced axially closer to a plane containing the hub element spoke fastening features than radially outer ends of the plurality of spokes.

2. The motorcycle wheel according to claim 1, wherein the hub connection region includes an axial opening which is concentric to an axis of rotation of the motorcycle wheel and is configured to receive the hub element.

3. The motorcycle wheel according to claim 2, wherein the hub connection region and the hub element are star-shaped when viewed along the rotation axis.

4. The motorcycle wheel according to claim 1, wherein the hub element includes radially extending webs configured to engage corresponding recesses of the hub connection region.

5. The motorcycle wheel according to claim 1, wherein the hub element includes a flange configured for connection of the hub element to the radially inner ends of the plurality of spokes in the hub connection region in a radially and axially adjoining manner.

6. The motorcycle wheel according to claim 1, wherein at least one brake dome is arranged on the hub element.

7. The motorcycle wheel according to claim 1, wherein the hub element is a hollow body.

8. The motorcycle wheel according to claim 1, wherein an axial length of the hub element corresponds to an axial width of the rim.

9. The motorcycle wheel according to claim 1, wherein the motorcycle wheel consists of two parts in the form of the hub element and the rim integrally formed with the plurality of spokes.

* * * * *